US 011389959B2

United States Patent
Furuichi et al.

(10) Patent No.: US 11,389,959 B2
(45) Date of Patent: Jul. 19, 2022

(54) ROBOT SYSTEM

(71) Applicant: FANUC CORPORATION, Yamanashi (JP)

(72) Inventors: Akifumi Furuichi, Yamanashi (JP); Kazutaka Nakayama, Yamanashi (JP); Kuniyasu Matsumoto, Yamanashi (JP); Yasuhiro Naitou, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 222 days.

(21) Appl. No.: 16/856,548

(22) Filed: Apr. 23, 2020

(65) Prior Publication Data

US 2020/0376660 A1    Dec. 3, 2020

(30) Foreign Application Priority Data

May 29, 2019   (JP) ............................. JP2019-100293

(51) Int. Cl.
   *B25J 9/16*   (2006.01)
   *B25J 13/08*   (2006.01)

(52) U.S. Cl.
   CPC ........... *B25J 9/1633* (2013.01); *B25J 9/1605* (2013.01); *B25J 9/1651* (2013.01); *B25J 9/1674* (2013.01); *B25J 9/1676* (2013.01); *B25J 13/085* (2013.01); *B25J 9/1628* (2013.01)

(58) Field of Classification Search
   None
   See application file for complete search history.

(56) References Cited

U.S. PATENT DOCUMENTS

| 2013/0211596 | A1* | 8/2013 | Takagi | B25J 9/1633 700/261 |
|---|---|---|---|---|
| 2015/0290809 | A1 | 10/2015 | Nakawawa et al. | |
| 2016/0031086 | A1 | 2/2016 | Tanabe et al. | |
| 2016/0113728 | A1* | 4/2016 | Piron | A61B 34/20 606/130 |
| 2016/0176052 | A1 | 6/2016 | Yamamoto | |
| 2016/0221193 | A1* | 8/2016 | Sato | B25J 9/1674 |
| 2019/0077017 | A1* | 3/2019 | Shimodaira | B25J 9/1692 |
| 2020/0306865 | A1* | 10/2020 | Motohashi | B23K 11/11 |

(Continued)

FOREIGN PATENT DOCUMENTS

| JP | 2003-039348 A | 2/2003 |
|---|---|---|
| JP | 2006-021287 A | 1/2006 |

(Continued)

*Primary Examiner* — Robert T Nguyen
*Assistant Examiner* — Dylan M Katz
(74) *Attorney, Agent, or Firm* — Maier & Maier, PLLC

(57) ABSTRACT

A robot system including a robot and a control device that controls the robot. The robot includes a first member, a second member that is rotationally driven around a predetermined first axis relative to the first member, and a first torque detector that detects a torque around the first axis. The control device includes an external-force upper-limit-value estimator that estimates an external-force upper limit value serving as an assumable upper limit value for an external force acting on the second member based on the torque detected by the first torque detector, and controls the robot to avoid an increase in the external force when the estimated external-force upper limit value is larger than a predetermined threshold value.

16 Claims, 14 Drawing Sheets

(56) References Cited

U.S. PATENT DOCUMENTS

2021/0267700 A1* 9/2021 Hares .................... B25J 9/1674
2021/0323148 A1* 10/2021 Matsuda ................ B25J 9/1607

FOREIGN PATENT DOCUMENTS

| JP | 2015-199174 A | 11/2015 |
|---|---|---|
| JP | 2016-032858 A | 3/2016 |
| JP | 5927284 B1 | 6/2016 |

* cited by examiner

US 11,389,959 B2

ROBOT SYSTEM

CROSS-REFERENCE TO RELATED APPLICATIONS

This application is based on Japanese Patent Application No. 2019-100293, the contents of which are incorporated herein by reference.

FIELD

The present disclosure relates to robot systems.

BACKGROUND

A known technology involves detecting a torque acting on a robot and stopping the robot when the detected torque exceeds an upper limit value (e.g., see Japanese Patent No. 5927284).

SUMMARY

An aspect of the present disclosure provides a robot system including a robot and a control device that controls the robot. The robot includes a first member, a second member that is rotationally driven around a predetermined first axis relative to the first member, and a first torque detector that detects a torque around the first axis, and the control device includes an external-force upper-limit-value estimator that estimates an external-force upper limit value serving as an assumable upper limit value for an external force acting on the second member based on the torque detected by the first torque detector, and controls the robot to avoid an increase in the external force when the estimated external-force upper limit value is larger than a predetermined threshold value.

DETAILED DESCRIPTION

Figure 1:
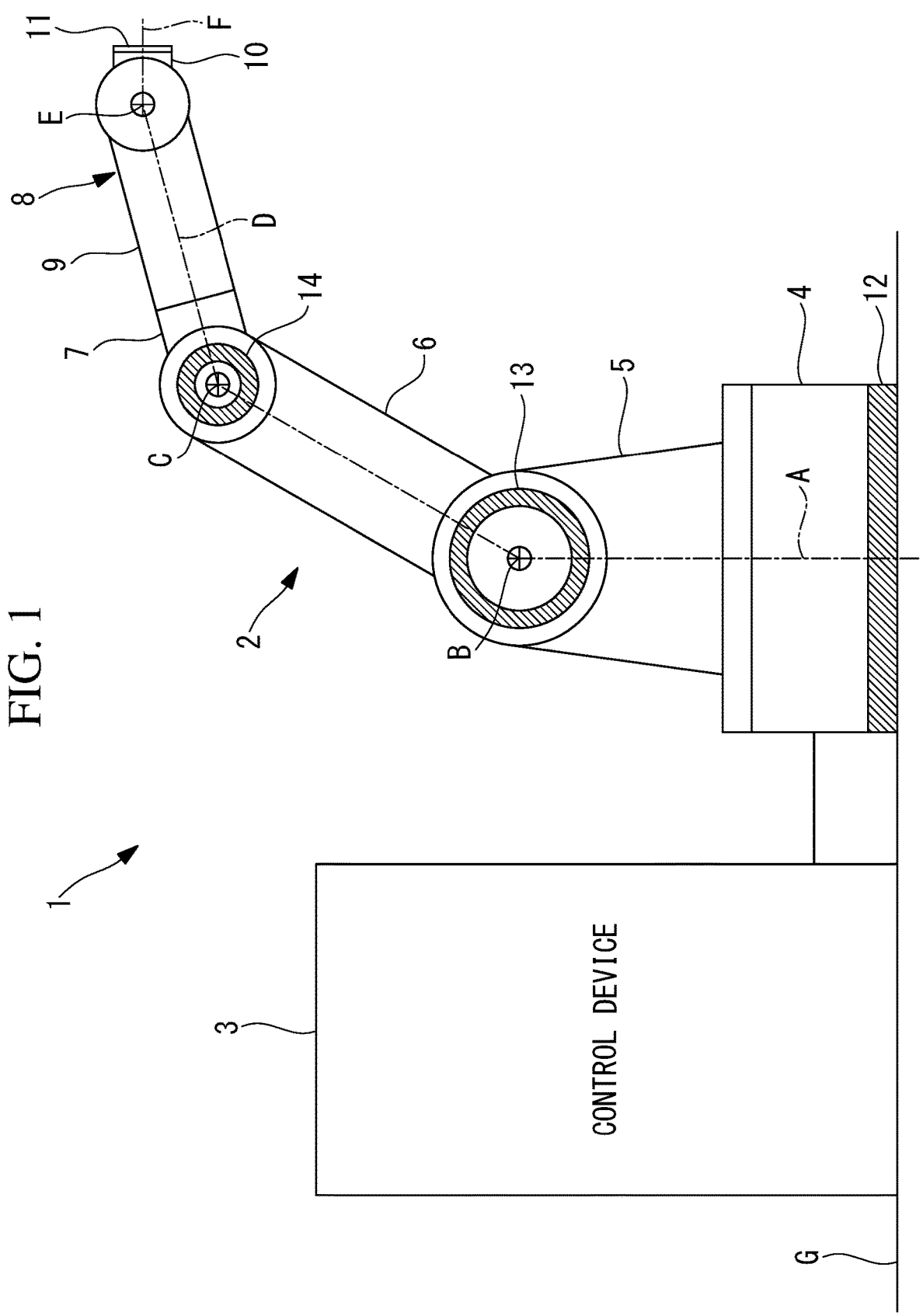
FIG. 1 illustrates the overall configuration of a robot system according to an embodiment of the present disclosure.

A robot system 1 according to an embodiment of the present disclosure will be described below with reference to the drawings. As shown in FIG. 1, the robot system 1 according to this embodiment includes a robot 2 and a control device 3 that controls the robot 2.

The robot 2 includes a base (third member) 4 set on a floor surface G, and also includes a rotating body (first member) 5 supported by the base 4 in a rotatable manner around a vertical J1 axis (second axis) A. The robot 2 includes a first arm (second member) 6 supported by the rotating body 5 in a rotatable manner around a horizontal J2 axis (first axis) B, and also includes a second arm (fourth member) 7 supported by the first arm 6 in a rotatable manner around a J3 axis (third axis) C extending parallel to the J2 axis B.

The robot 2 includes a three-axis wrist unit 8 at the distal end of the second arm 7. The wrist unit 8 includes a first wrist component 9 supported by the second arm 7 in a rotatable manner around a J4 axis D extending in the longitudinal direction of the second arm 7. The wrist unit 8 includes a second wrist component 10 supported by the first wrist component 9 in a rotatable manner around a J5 axis E extending orthogonally to the J4 axis D. The wrist unit 8 includes a third wrist component 11 supported by the second wrist component 10 in a rotatable manner around a J6 axis F extending orthogonally to the J5 axis E and through an intersection point between the J4 axis D and the J5 axis E.

The robot 2 according to this embodiment includes a torque sensor (second torque detector) 12 that is disposed between the floor surface G and the base 4 and that detects a torque around the J1 axis A. The robot 2 includes a torque sensor (first torque detector) 13 that detects a torque around the J2 axis B between the rotating body 5 and the first arm 6. The robot 2 includes a torque sensor (third torque detector) that detects a torque around the J3 axis C between the first arm 6 and the second arm 7.

Figure 2:
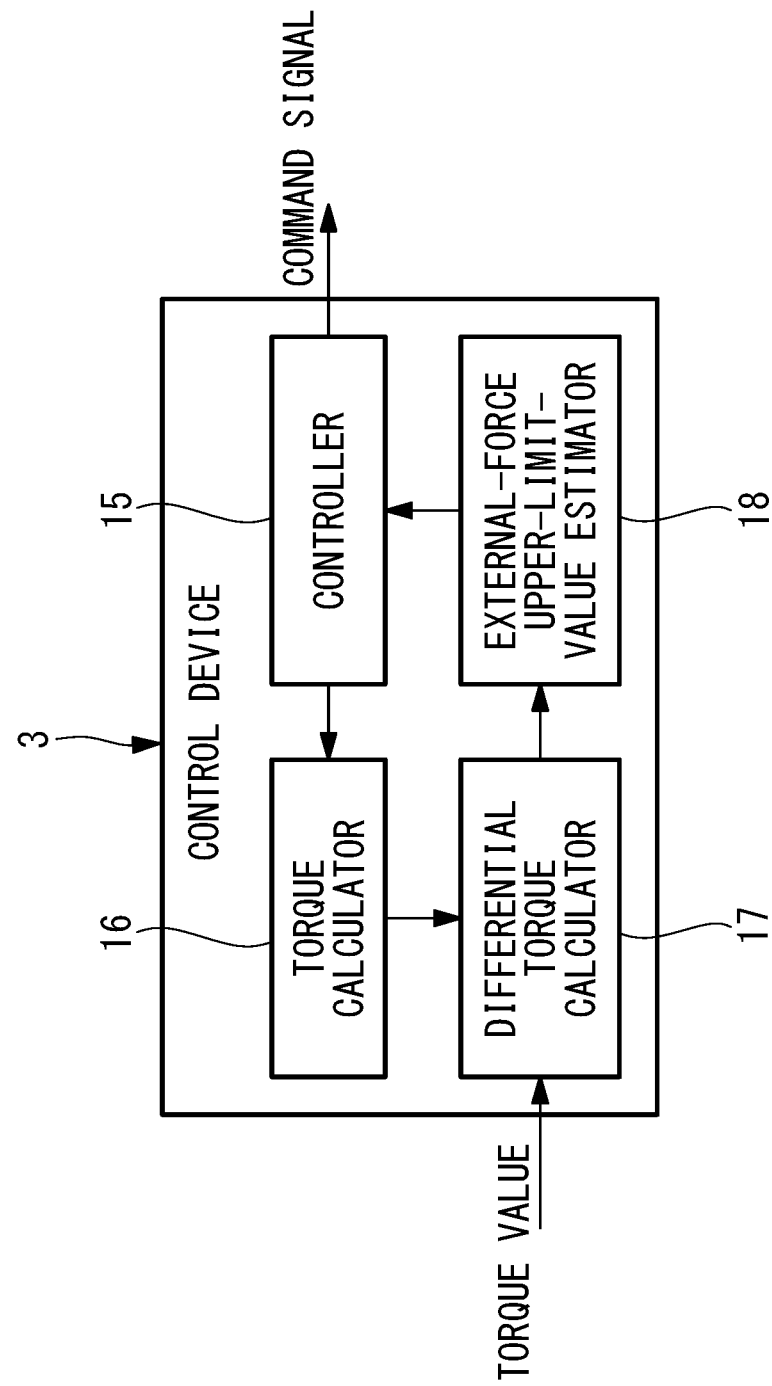
FIG. 2 is a block diagram illustrating a control device included in the robot system in FIG. 1.

The control device 3 is constituted by a processor and a memory. As shown in FIG. 2, the control device 3 includes a controller 15 that outputs a command signal to the robot 2 in accordance with a learned program. The control device 3 includes a torque calculator 16 that receives the position (orientation) of a tool tip of the robot 2 and the speed (movement) of each shaft from the controller 15, and that successively calculates torque values acting around the J1 axis A to the J3 axis C in accordance with the orientation and the movement.

The control device 3 includes a differential torque calculator 17 that receives a torque value detected by each of the torque sensors 12, 13, and 14 and that calculates, for each shaft, an absolute value of a differential torque value indicating a difference between the received torque value and a torque value calculated by the torque calculator 16 in accordance with the orientation of the robot 2 and the speed and acceleration of each driver. Moreover, the control device includes an external-force upper-limit-value estimator 18 that estimates an external-force upper limit value Pa, as an assumable upper limit value for an external force P acting on the robot 2, based on the calculated differential torque value.

The external-force upper-limit-value estimator 18 stores, for each shaft, a minimum radius from an axis at a physically contactable position, due to the structure of the robot 2, on a surface disposed at each of the opposite ends, in the rotational direction, of any of two of the members 4, 5, 6, and 7 relatively rotated around the axes A, B, and C.

Figure 3:
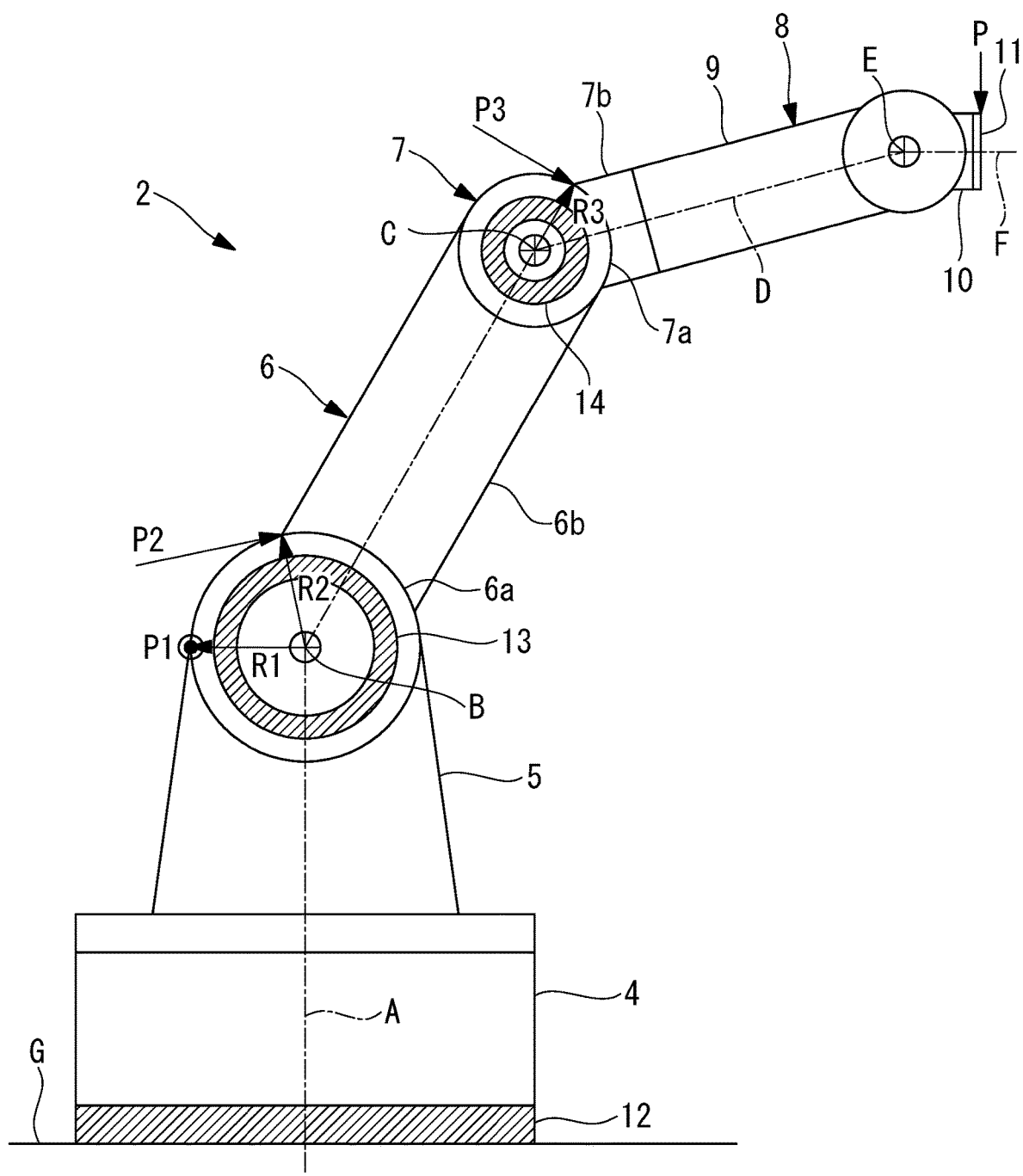
FIG. 3 is a side view of a robot included in the robot system in FIG. 1 and illustrates an example of external-force upper limit values around a J1 axis to a J3 axis of the robot.

For example, with regard to the rotating body 5 rotated around the J1 axis A relative to the base 4, the radius at a position closest to the J1 axis A on a surface extending in the radial direction of the rotating body 5, and having a possibility that an operator may physically come into contact therewith, and in the direction of the J1 axis A is stored. For example, as shown in FIG. 3, in a case where the rotating body 5 has a conical outer surface centered on the J1 axis A, a radius R1 from the J1 axis A on a surface where the cross section is the smallest is stored.

For example, with regard to the first arm 6 rotated around the J2 axis B relative to the rotating body 5, the radius at a position closest to the J2 axis B on a surface extending in the radial direction of the first arm 6, and having a possibility that an operator may physically come into contact therewith, and in the direction of the J2 axis B is stored. For example, as shown in FIG. 3, in a case where the first arm 6 includes an end 6a having a cylindrical outer surface centered on the J2 axis B and an arm 6b extending radially outward from the surface of the end 6a, a radius R2 from the J2 axis B at the base of the arm 6b, that is, a radius R2 on the outer surface of the end 6a, is stored.

For example, with regard to the second arm 7 rotated around the J3 axis C relative to the first arm 6, the radius at a position closest to the J3 axis C on a surface extending in the radial direction of the second arm 7, and having a possibility that an operator may physically come into contact therewith, is stored. For example, as shown in FIG. 3, in a case where the second arm 7 includes an end 7a having a cylindrical outer surface centered on the J3 axis C and an arm 7b extending radially outward from the surface of the end 7a, a radius R3 from the J3 axis C at the base of the arm 7b, that is, a radius R3 on the outer surface of the end 7a, is stored.

The external-force upper-limit-value estimator 18 divides the absolute value of the differential torque calculated by the differential torque calculator 17 by each stored minimum radius, so as to calculate the external-force upper limit value Pa. Specifically, if there is a differential torque calculated by the differential torque calculator 17, it is clear that there is an external force P acting on some location on the surface of the robot 2 with respect to a shaft where the differential torque exists.

Since it is not possible to specify the location receiving the external force P, it is not possible to determine the magnitude of the actual external force P based on the magnitude of the differential torque alone. However, by dividing the differential torque by each of the minimum radii R1, R2, and R3 at the physically contactable positions, each of maximum values P1, P2, and P3 for an external force that may be generated as a result of the contact can be determined as an external-force upper limit value Pa.

Then, the controller 15 compares the external-force upper limit value Pa estimated by the external-force upper-limit-value estimator 18 with a predetermined threshold value. When the external-force upper limit value Pa is larger than the predetermined threshold value, the controller 15 controls the robot 2 to stop or retract. In ISO/TS 15066, a threshold value for a biodynamical load that an operator can withstand without being injured when the robot 2 and the operator come into contact with each other is set for each contactable part of the operator's body. The controller 15 stores the smallest value among these threshold values as a threshold value and determines whether or not the calculated external-force upper limit value Pa is larger than the threshold value.

The stopping operation or the retracting operation of the robot 2 performed by the controller 15 is for preventing the external-force upper limit value Pa from increasing. Specifically, the stopping operation involves stopping the robot 2 at that location, and the retracting operation involves moving the robot 2 in a direction for alleviating the external force, such as the direction opposite to that of the previous movement.

In the robot system 1 according to this embodiment having the above-described configuration, with respect to the external force that can generate the torque detected by each of the torque sensors 12, 13, and 14, the external-force upper limit value Pa acting on the physically contactable position with the minimum radius is compared with the predetermined threshold value. Specifically, in a case where a significant torque is detected by the torque sensor 12, 13, or 14, it is regarded that an external force P having the magnitude of the external-force upper limit value Pa is acting on the physically contactable position with the minimum radius.

Accordingly, for example, the actual load applied to the operator when the operator comes into contact with the robot 2 is reliably smaller than or equal to the external-force upper limit value Pa. Specifically, the robot system 1 according to this embodiment is advantageous in that the robot 2 can be reliably stopped or retracted before the operator receives a biodynamical load that the operator can withstand without being injured.

The external-force upper limit value Pa can be estimated more securely by storing an even smaller value as a minimum radius value. However, this is not preferable since the external-force upper limit value Pa is set too much toward the safe side to an extent that the robot 2 is stopped or retracted even when an extremely small external force P is applied to a position distant from the axis A, B, or C.

In this embodiment, the external-force upper limit values P1, P2, and P3 are calculated for the respective shafts, and each are compared with the threshold value. Alternatively, for example, in a case where a torque around the J1 axis A is detected by the torque sensor 12 and a torque around the J2 axis B disposed in a plane extending orthogonally to the J1 axis A is detected by the torque sensor 13, the external-force upper limit value Pa may be estimated as follows.

Specifically, an external-force upper limit value (second external-force upper-limit value) P1 is calculated in accordance with the above-described method based on the torque around the J1 axis A, an external-force upper limit value (first external-force upper-limit value) P2 is calculated in accordance with the above-described method based on the torque around the J2 axis B, and the two calculated external-force upper-limit values are combined. Accordingly, the combined external-force upper limit value (combined external force) Pa may be calculated using the expression indicated below:

$$Pa = \sqrt{(P1^2 + P2^2)} \tag{1}$$

where Pa denotes the combined external-force upper limit value, P1 denotes the external-force upper limit value around the J1 axis A, and P2 denotes the external-force upper limit value around the J2 axis B.

Figure 4:
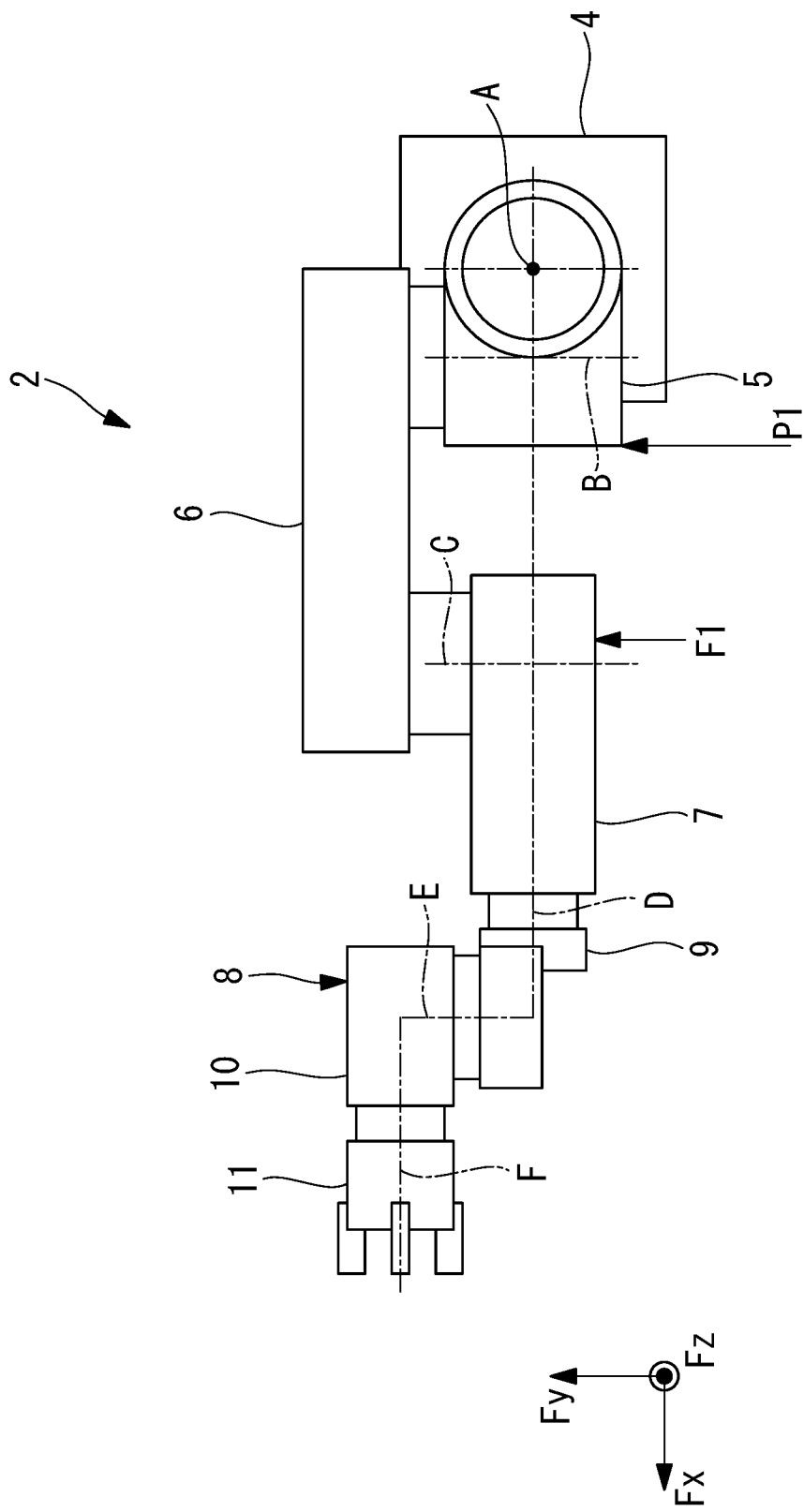
FIG. 4 is a plan view of the robot and explains an external-force upper limit value in a modification of the robot system in FIG. 1.
Figure 5:
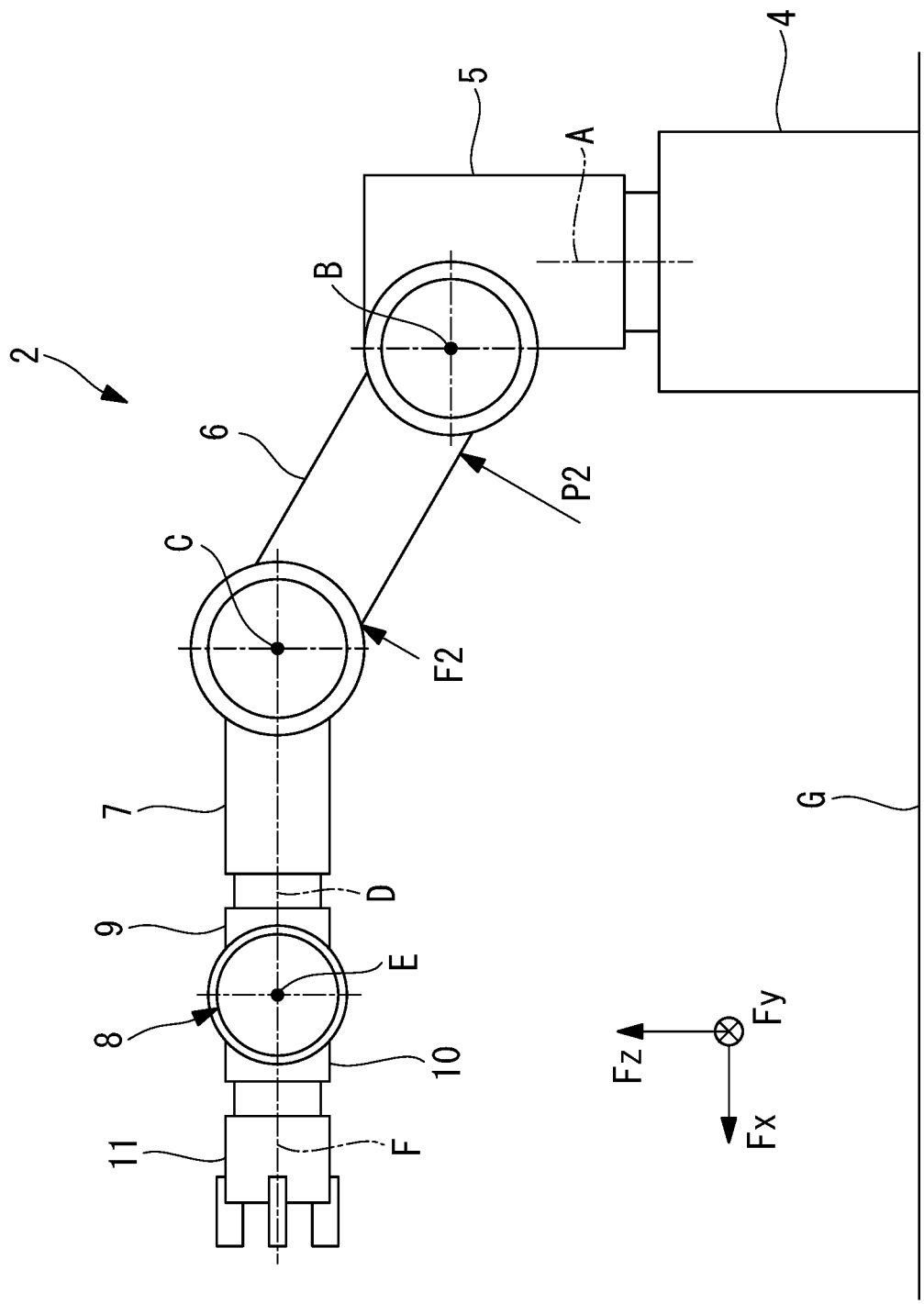
FIG. 5 is a side view of the robot in the robot system in FIG. 4.

For example, as shown in FIGS. 4 and 5, an orthogonal coordinate system with respect to the robot 2 is conceptualized. Then, it is assumed that an external force component F1 in a horizontal plane, as shown in FIG. 4, and an external force component F2 in a vertical plane, as shown in FIG. 5, are applied as an external force to the first arm 6 of the robot 2.

In this case, as shown in FIG. 4, the external-force upper limit value P1 is estimated from the torque around the J1 axis A detected by the torque sensor 12. It is conceivable that the external-force upper limit value P1 acts in an arbitrary direction in the Fx-Fy plane. As shown in FIG. 5, the external-force upper limit value P2 is estimated from the torque around the J2 axis B detected by the torque sensor 13. It is conceivable that the external-force upper limit value P2 acts in an arbitrary direction in the Fx-Fz plane.

Figure 6:
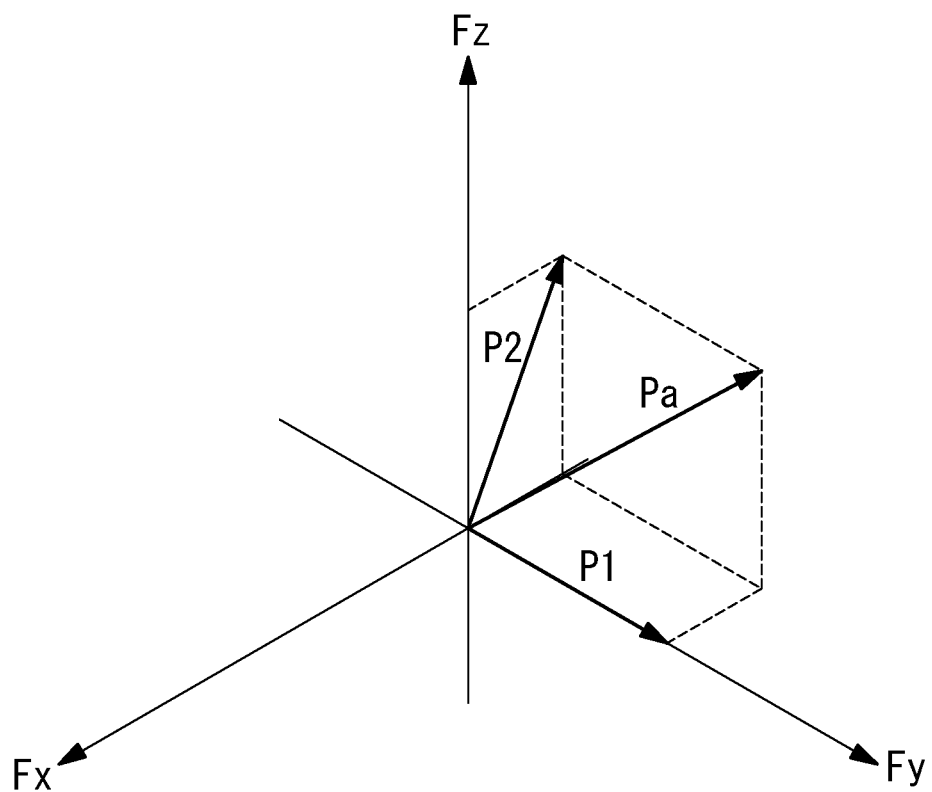
FIG. 6 is a diagram explaining a method for calculating a combined external force from external-force upper limit values for shafts estimated in the robot system in FIGS. 4 and 5.

Therefore, in this case, the combined external-force upper limit value Pa can be calculated in accordance with the root sum square of the external-force upper limit values P1 and P2 indicated in Expression (1), as shown in FIG. 6. Although the above description relates to an example where the torque around the J1 axis A and the torque around the J2 axis B are detected, the embodiment is not limited to this example.

Figure 7:
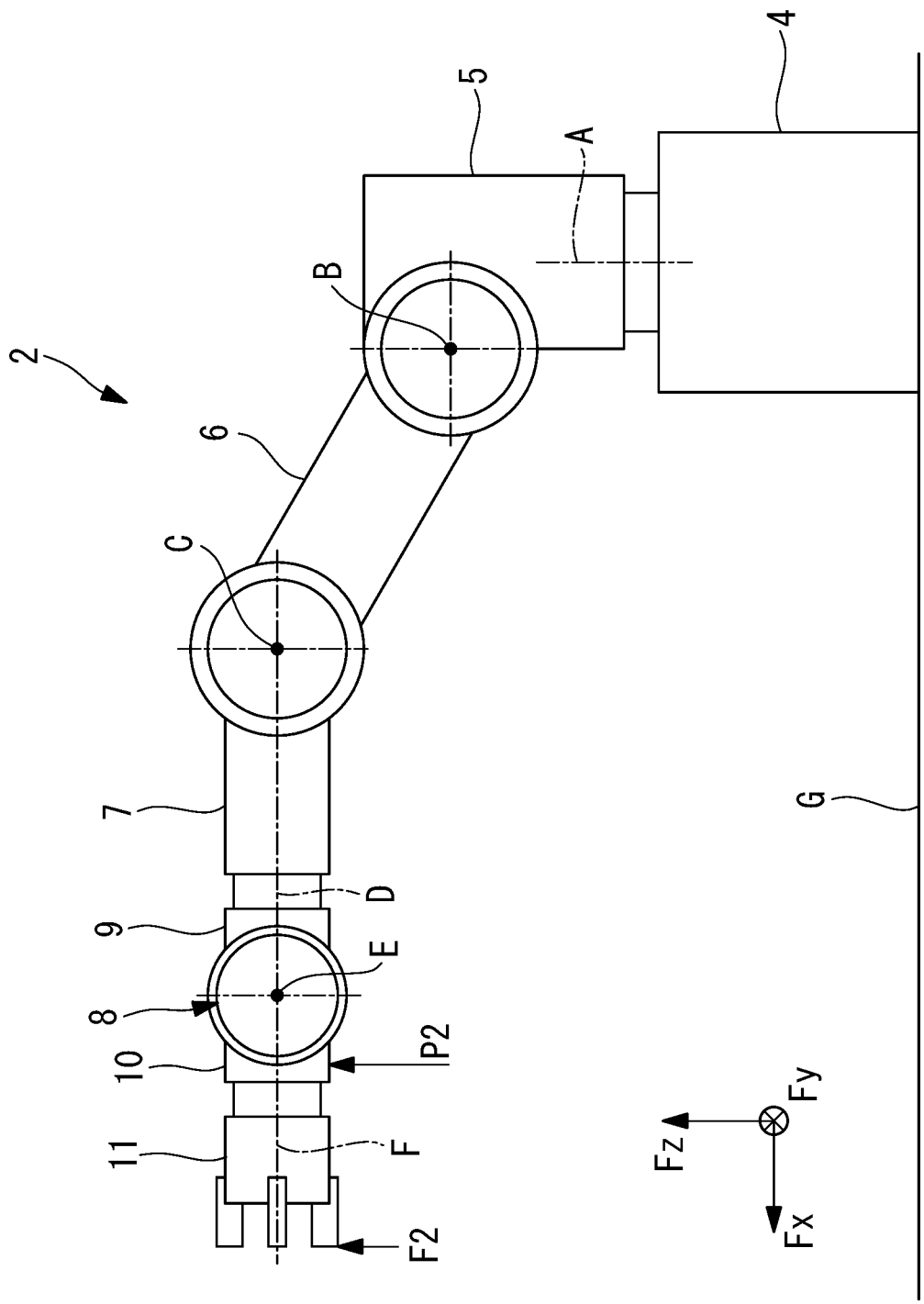
FIG. 7 is a side view of the robot and explains an external-force upper limit value in another modification of the robot system in FIG. 1.
Figure 8:
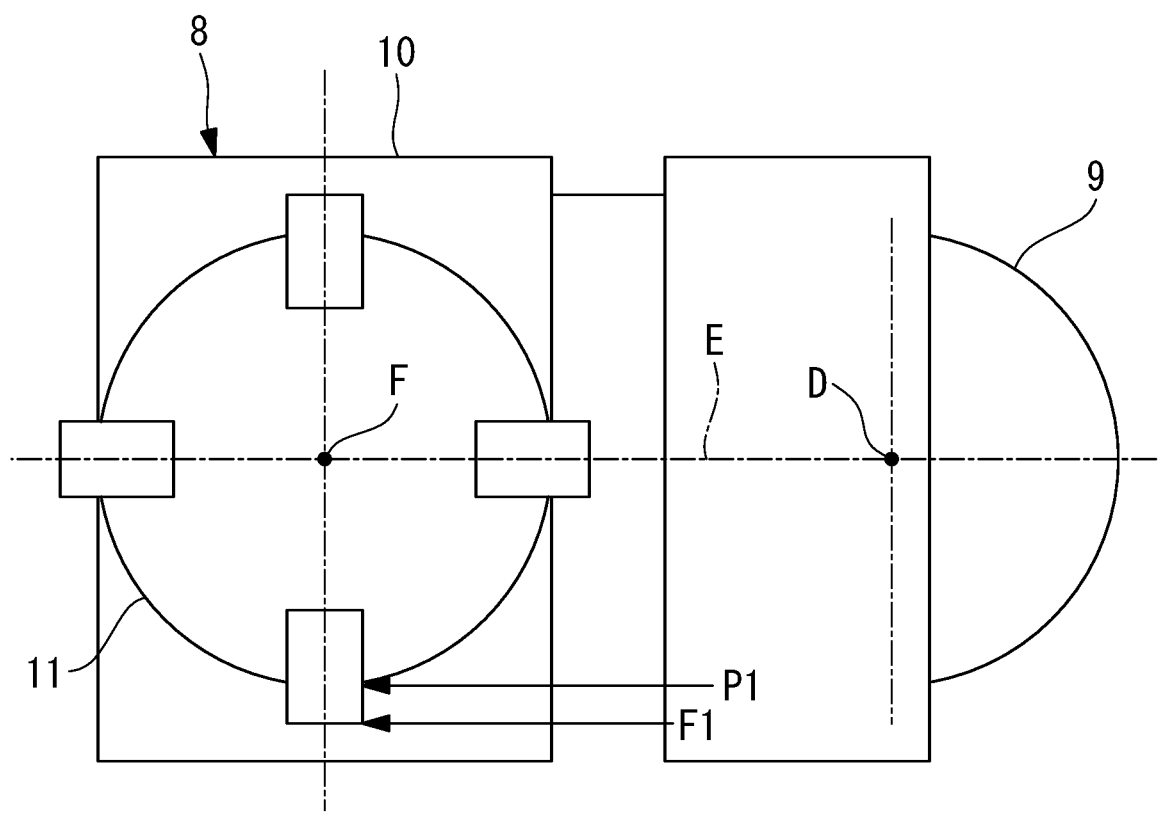
FIG. 8 is a front view of a wrist unit of the robot in the robot system in FIG. 7.

For example, as shown in FIGS. 7 and 8, the same applies to a case where a torque sensor (not shown) that detects a torque around the J4 axis D and a torque sensor (not shown) that detects a torque around the J5 axis E are provided. Specifically, an external-force upper limit value P1 estimated from the torque around the J4 axis D detected by the corresponding torque sensor acts in an arbitrary direction in the Fx-Fy plane, as shown in FIG. 8.

Figure 9:
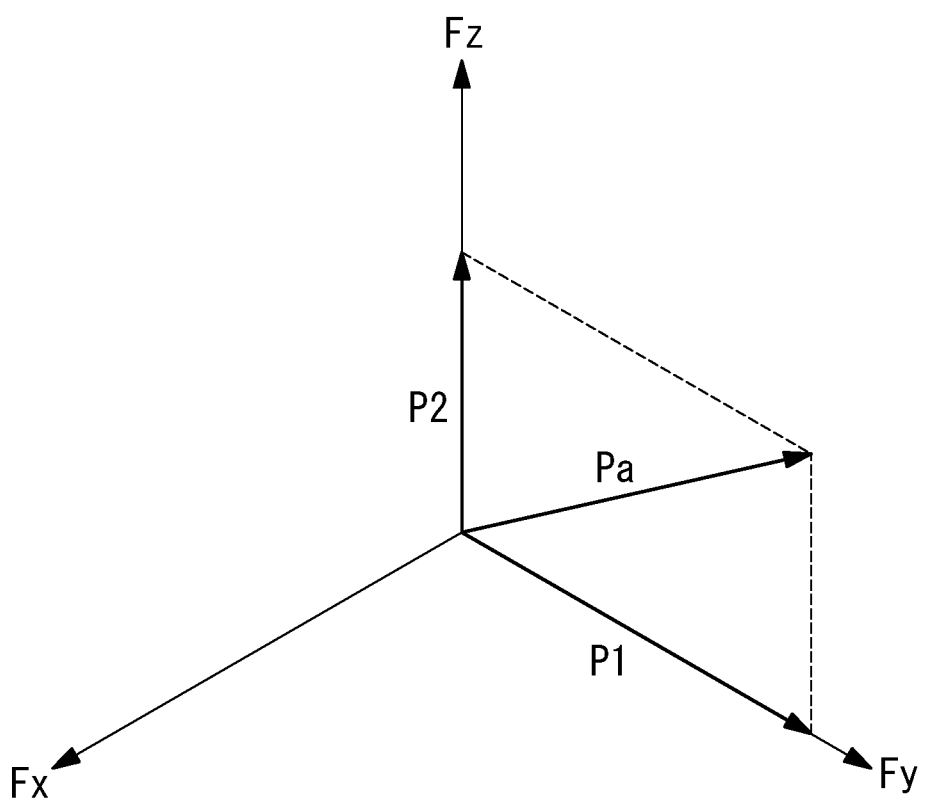
FIG. 9 is a diagram explaining a method for calculating a combined external force from external-force upper limit values for shafts estimated in the robot system in FIGS. 7 and 8.

An external-force upper limit value P2 estimated from the torque around the J5 axis E detected by the corresponding torque sensor acts in an arbitrary direction in the Fx-Fz plane, as shown in FIG. 7. The J4 axis D and the J5 axis E extend along planes that are orthogonal to each other. Therefore, in this case, the combined external-force upper limit value Pa can be similarly calculated in accordance with the root sum square of the external-force upper limit values P1 and P2 indicated in Expression (1), as shown in FIG. 9.

Although the above description relates to an example where the torques around the two adjacent axes B and C among the axes A, B, C, D, E, and F of the robot 2 are detected, the embodiment is not limited to this example. For example, torques around two non-adjacent axes among the axes A, B, C, D, E, and F, such as the J1 axis A and the J3 axis C or the J2 axis B and the J4 axis D, may be detected and combined.

In a case where a torque around the J2 axis B and a torque around the J3 axis C extending parallel to the J2 axis B are detected, an external-force upper limit value P2 is calculated in accordance with the above-described method based on the torque around the J2 axis B, and an external-force upper limit value (third external-force upper limit value) P3 is calculated in accordance with the above-described method based on the torque around the J3 axis C. Then, for example, an external-force upper limit value Pa based on the J1 axis A may be estimated from the calculated first external-force upper limit value P2 and third external-force upper limit value P3.

In a case where a torque around the J2 axis B and a torque around the J3 axis C extending parallel to the J2 axis B are detected, an external-force upper limit value P2 is calculated in accordance with the above-described method based on the torque around the J2 axis B, and an external-force upper limit value (third external-force upper limit value) P3 is calculated in accordance with the above-described method based on the torque around the J3 axis C. Then, the calculated first external-force upper limit value P2 and third external-force upper limit value P3 are compared with each other, and the smaller one of the values may be estimated as an external-force upper limit value Pa.

Figure 10:
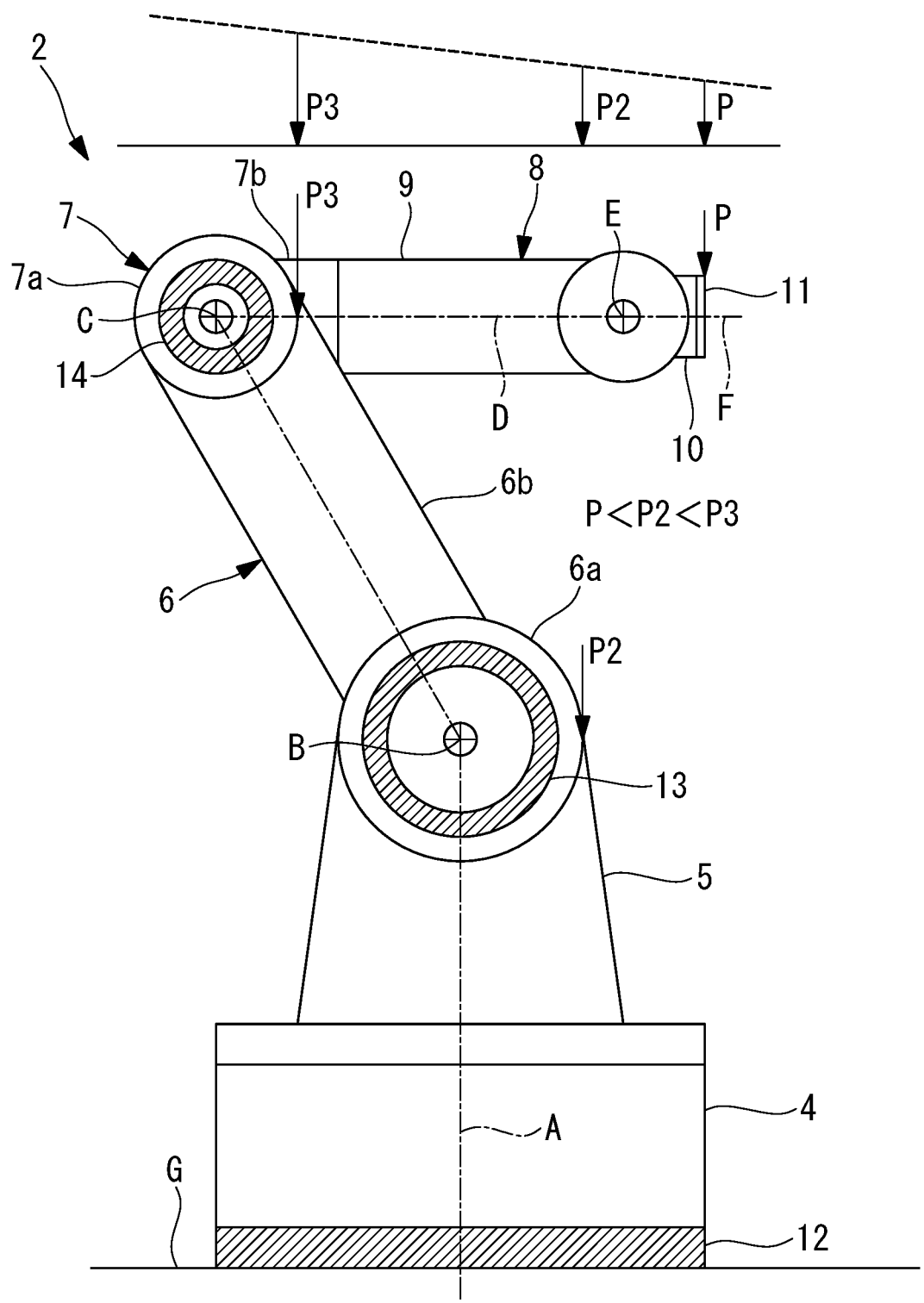
FIG. 10 is a side view of the robot and explains a method for estimating an external-force upper limit value in a modification of the robot system in FIG. 1.
Figure 11:
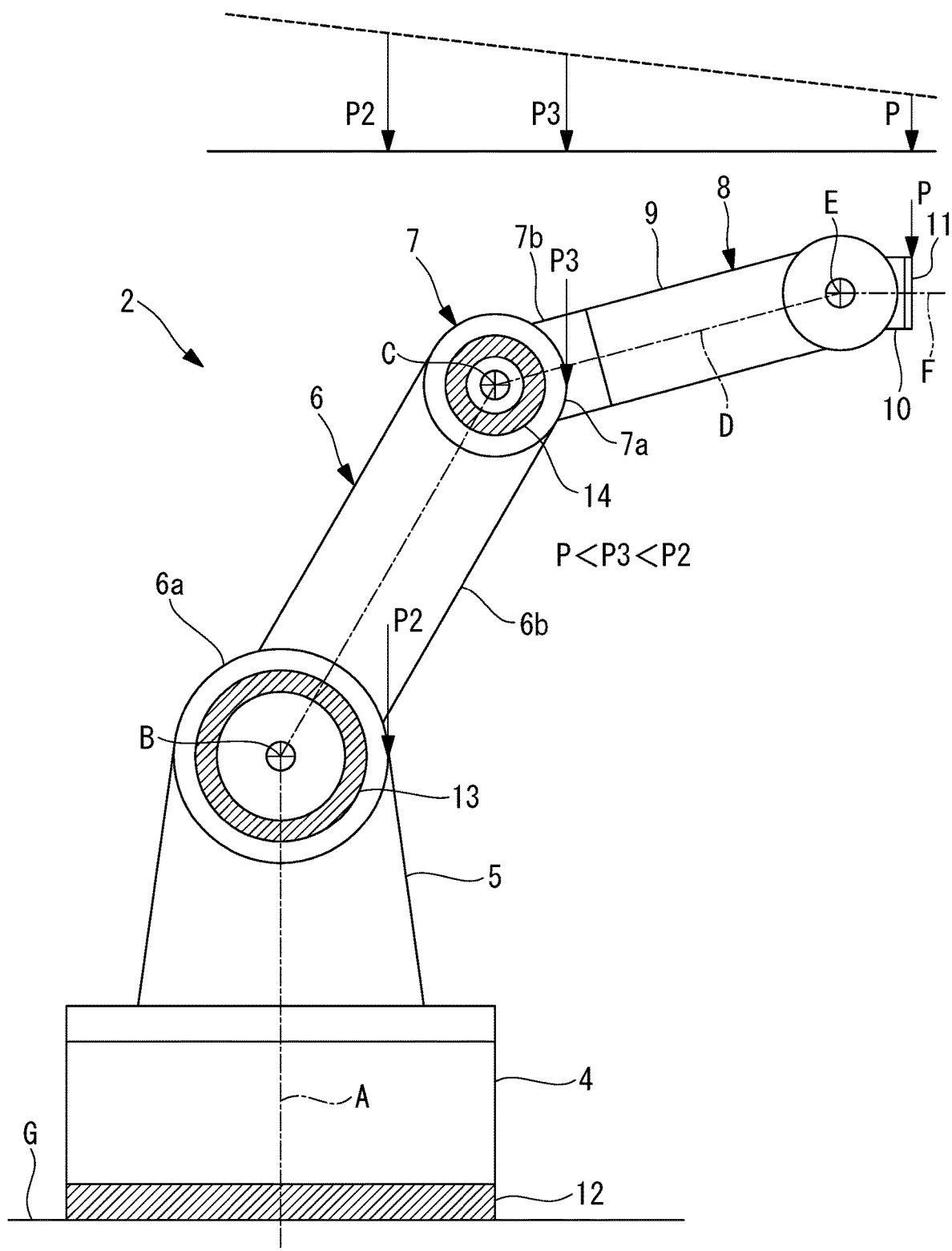
FIG. 11 is a side view of the robot and explains a method for estimating an external-force upper limit value in an orientation different from that in FIG. 4.

Specifically, as shown in FIGS. 10 and 11, in a case where an external force acts on the distal end of the second arm 7, torques acting in the same direction around the J2 axis B and the J3 axis C that are parallel to each other are detected. The two external-force upper limit values P2 and P3 calculated based on the two detected torques are both used for estimating the same external force and each are an assumable maximum value, so that the smaller one of the values serves as a value closer to the actual external force P.

Therefore, in the case of FIG. 10, the external-force upper limit value P2 calculated based on the torque around the J2 axis B may be estimated as an external-force upper limit value Pa, and in the case of FIG. 11, the external-force upper limit value P3 calculated based on the torque around the J3 axis C may be estimated as an external-force upper limit value Pa. Accordingly, the external force P can be estimated more accurately.

In this embodiment, the external-force upper limit value Pa is calculated by using a minimum radius at a physically contactable position due to the structure of the robot 2. Alternatively, as in a case where the robot 2 is partially covered or surrounded by a safety fence, the embodiment may be applied to a case where a physically non-contactable position occurs due to the cover or the safety fence.

If there is a section not contactable from the outside by the operator due to the installation environment of the robot 2, a minimum radius in a range where the robot 2 is contactable may be used. An example of a case where there is a non-contactable section due to the installation environment is a case where the operator is restricted from approaching a specific section of the robot 2 by, for example, a sensor.

Figure 12:
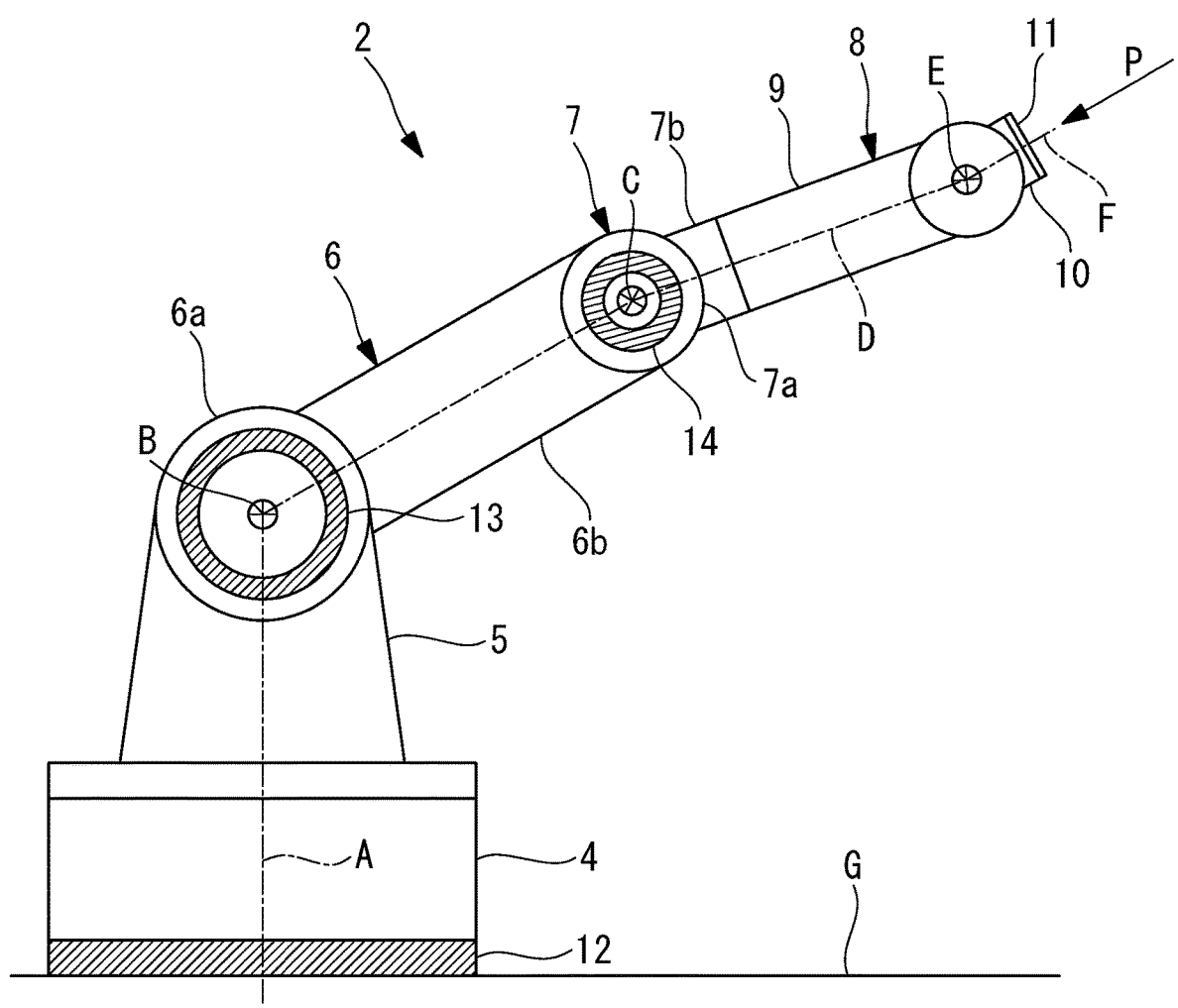
FIG. 12 is a side view of the robot and explains a specific orientation of the robot in the robot system in FIG. 1.

As shown in FIG. 12, in a case where the external force P acts in a direction extending along a line orthogonal to the J2 axis B and the J3 axis C in a plane including the J1 axis A, the torques around the J1 axis A to the J3 axis C are all small. Specifically, such an orientation of the robot 2 is an orientation (specific orientation) where it is difficult for all the torque sensors 12, 13, and 14 to detect torques.

In this embodiment, since the estimation of an external-force upper limit value Pa is assumed based on the fact that a torque is detectable, the control device 3 may determine whether or not the robot 2 is in the specific orientation from the angle of each driver of the robot 2, and may restrict the robot 2 from moving when the robot 2 is determined as being in the specific orientation. The robot 2 may be restricted from moving by reducing the operating speed to a predetermined speed or lower. Another alternative is to restrict the robot 2 from moving in the direction of an external force P that causes the torque detection by the torque sensors 12, 13, and 14 to be difficult.

As an alternative to this embodiment in which the robot 2 is of a vertical articulated type, a horizontal articulated robot may be employed. As an alternative to this embodiment in which the torque sensors 12, 13, and 14 are described as torque detectors that detect torques, the torques may each be estimated by detecting an electric current of a motor that drives each component. In a case where a secondary encoder is provided, the torques may each be estimated based on angle information detected by the secondary encoder.

Figure 13:
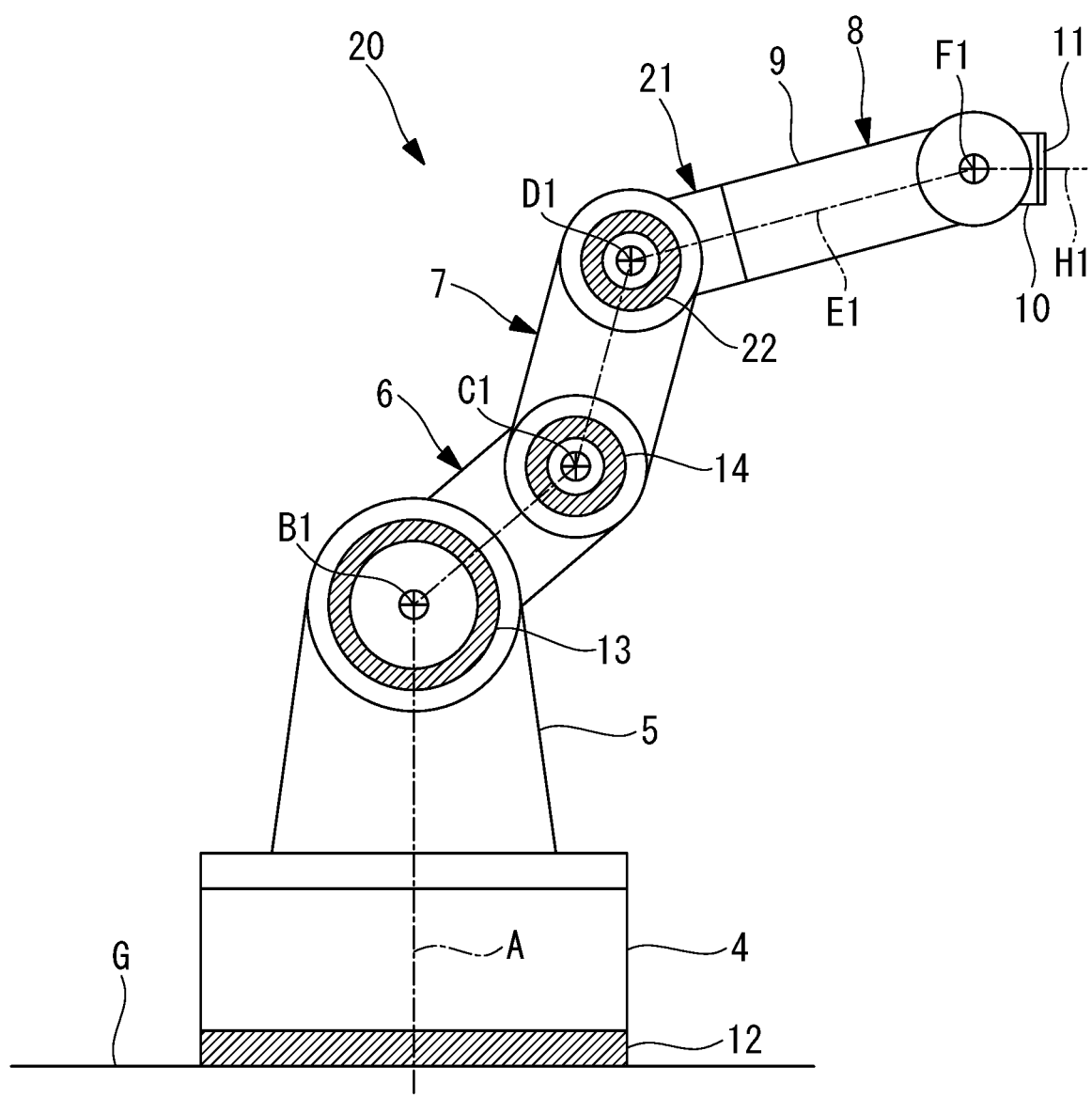
FIG. 13 is a side view of the robot and illustrates a modification of the robot in the robot system in FIG. 1.

As an alternative to the robot 2 of a six-axis articulated type, the embodiment may be applied to a seven-axis articulated robot 20. In this case, as shown in FIG. 13, torque sensors 12, 13, 14, and 22 that detect torques around a J1 axis A1 to a J4 axis D1 may be disposed. Reference sign 21 denotes a third arm supported by the second arm 7 in a rotatable manner around the J4 axis D1 extending parallel to the J3 axis C1.

In this case, the first wrist component 9 is supported by the third arm 21 in a rotatable manner around a J5 axis E1 extending in the longitudinal direction of the third arm 21. The second wrist component 10 is supported by the first wrist component 9 in a rotatable manner around a J6 axis F1 extending orthogonally to the J5 axis E1. The third wrist component 11 is supported by the second wrist component 10 in a rotatable manner around a J7 axis H1 extending orthogonally to the J6 axis F1 and through an intersection point between the J5 axis E1 and the J6 axis F1.

Then, based on the lowest external-force upper limit value among three external-force upper limit values estimated based on torque values detected by the torque sensors 13, 14, and 22 and an external-force upper limit value estimated based on a torque value detected by the torque sensor 12, the external-force upper-limit-value estimator 18 estimates an external-force upper limit value used for a comparison with the predetermined threshold value.

As an alternative to this embodiment in which the torque sensor 12 is provided in the base 4, the torque sensor 13 is provided in the rotating body 5, and the torque sensor 14 is provided in the first arm 6, the torque sensor 12 may be provided in the floor surface G, the torque sensor 13 may be provided in the first arm 6, and the torque sensor 14 may be provided in the second arm 7. Specifically, by adjusting the torque calculation method in the torque calculator 16, each torque sensor may be disposed in either one of two drivers that move relatively in accordance with rotation around each of the axes A, B, and C.

Figure 14:
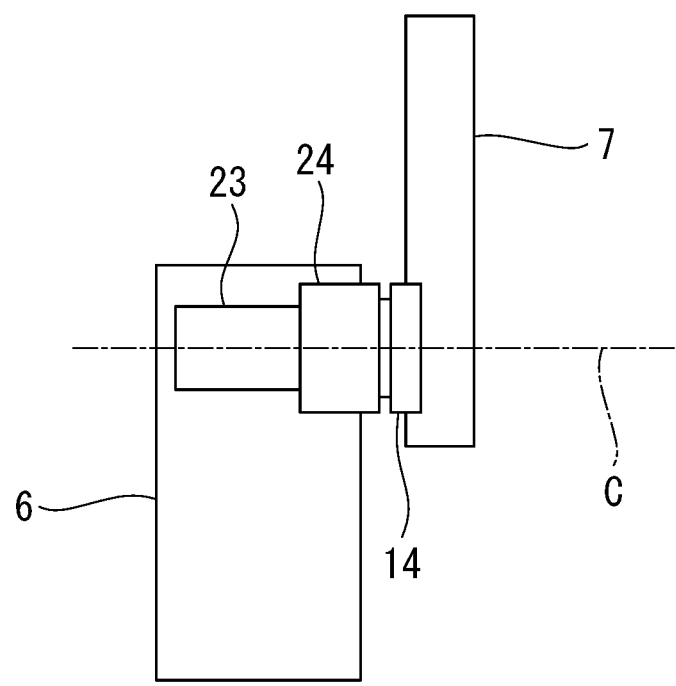
FIG. 14 is an expanded front view of the robot and illustrates another modification of the robot in the robot system in FIG. 1.

For example, in a case where the first arm 6 and the second arm 7 are used as two drivers, the torque sensor 14, a motor 23 that drives the second arm 7 around the J3 axis C, and a speed reducer 24 are disposed in the first arm 6 and the second arm 7, as shown in FIG. 14. In this case, the second arm 7 as a driver to be desirably made narrower is provided with the torque sensor 14, so that the second arm 7 can be made narrower.

The invention claimed is:

1. A robot system comprising:
a robot; and
a control device that controls the robot, wherein the robot includes a first member, a second member that is rotationally driven around a predetermined first axis relative to the first member, and a first torque detector that is configured to detects a torque around the first axis, wherein the control device is configured to:
estimates an external-force upper limit value serving as an assumable upper limit value for an external force acting on the second member based on the torque detected by the first torque detector,
controls the robot to avoid an increase in the external force when the estimated external-force upper limit value is larger than a predetermined threshold value,
calculate the external-force upper limit value based on an absolute value of a differential torque between the torque detected by the first torque detector and a calculated torque calculated from an orientation and a movement of the robot, and
estimate, as the external-force upper limit value, a value obtained by dividing the absolute value of the differential torque by a minimum radius from the first axis at a physically contactable position on a surface serving as opposite ends of the second member in a rotational direction.

2. The robot system according to claim 1, wherein the robot includes a third member that is rotationally driven relatively to the first member around a predetermined second axis disposed in a plane orthogonal to the first axis, a second torque detector that is configured to detects a torque around the second axis, and the control device is further configured to estimates the external-force upper limit value by using a first external-force upper limit value calculated based on the torque detected by the first torque detector and a second external-force upper limit value calculated based on the torque detected by the second torque detector.

3. The robot system according to claim 2, wherein the control device is further configured to estimates the external-force upper limit value in accordance with the root sum square of the first external-force upper limit value and the second external-force upper limit value.

4. The robot system according to claim 2, wherein the robot includes a fourth member that is rotationally driven relative to the second member around a third axis extending parallel to the first axis, a third torque detector that is configured to detects a torque around the third axis, and the control device is further configured to estimates the external-force upper limit value by using the first external-force upper limit value calculated based on the torque detected by the first torque detector and a third external-force upper limit value calculated based on the torque detected by the third torque detector.

5. The robot system according to claim 2, wherein the robot includes a fourth member that is rotationally driven relative to the second member around a third axis extending parallel to the first axis, a third torque detector that is configured to detects a torque around the third axis, and the control device is further configured to
compares the first external-force upper limit value calculated based on the torque detected by the first torque detector with a third external-force upper limit value calculated based on the torque detected by the third torque detector, and
estimates the external-force upper limit value by using only a smaller one of the compared values.

6. The robot system according to claim 2, wherein the control device is further configured to
determines whether the robot is in a specific orientation in which the robot has a possibility of contact that involves the robot receiving an external force that causes the detection of the torques by all of the torque detectors included in the robot to have decreased torque detection accuracy and
restricts the robot from moving when the robot is determined as being in the specific orientation.

7. The robot system according to claim 6, wherein, when the robot is determined as being in the specific orientation, the control device is further configured to reduces an operating speed of the robot.

8. The robot system according to claim 6, wherein, when the robot is determined as being in the specific orientation, the control device restricts the robot from moving in a direction of the external force that causes the detection of the torques to have decreased torque detection accuracy.

9. A robot system comprising:
a robot; and
a control device that controls the robot, wherein the robot includes a first member, a second member that is rotationally driven around a predetermined first axis relative to the first member, and a first torque detector that is configured to detect a torque around the first axis, and the control device is configured to:
estimate an external-force upper limit value serving as an assumable upper limit value for an external force acting on the second member based on the torque detected by the first torque detector,
control the robot to avoid an increase in the external force when the estimated external-force upper limit value is larger than a predetermined threshold value,
calculate the external-force upper limit value based on an absolute value of a differential torque between the torque detected by the first torque detector and a calculated torque calculated from an orientation and a movement of the robot, and
estimate, as the external-force upper limit value, a value obtained by dividing the absolute value of the differential torque by a minimum radius from the first axis at a contactable position, due to an installation environment of the robot, on a surface serving as opposite ends of the second member in a rotational direction.

10. The robot system according to claim 9, wherein the robot includes a third member that is rotationally driven relatively to the first member around a predetermined second axis disposed in a plane orthogonal to the first axis, a second torque detector that is configured to detect a torque around the second axis, and the control device is further configured to:
estimate the external-force upper limit value by using a first external-force upper limit value calculated based on the torque detected by the first torque detector and a second external-force upper limit value calculated based on the torque detected by the second torque detector.

11. The robot system according to claim 10, wherein the control device is further configured to:
estimate the external-force upper limit value in accordance with the root sum square of the first external-force upper limit value and the second external-force upper limit value.

12. The robot system according to claim 10, wherein the robot includes a fourth member that is rotationally driven relative to the second member around a third axis extending parallel to the first axis, a third torque detector that is configured to detect a torque around the third axis, and the control device is further configured to:
estimate the external-force upper limit value by using the first external-force upper limit value calculated based on the torque detected by the first torque detector and a third external-force upper limit value calculated based on the torque detected by the third torque detector.

13. The robot system according to claim 10, wherein the robot includes a fourth member that is rotationally driven relative to the second member around a third axis extending parallel to the first axis, a third torque detector that is configured to detect a torque around the third axis, and the control device is further configured to:
compare the first external-force upper limit value calculated based on the torque detected by the first torque detector with a third external-force upper limit value calculated based on the torque detected by the third torque detector, and
estimate the external-force upper limit value by using only a smaller one of the compared values.

14. The robot system according to claim 10, wherein the control device is further configured to:
determine whether the robot is in a specific orientation in which the robot has a possibility of contact that involves the robot receiving an external force that causes the detection of the torques by all of the torque detectors included in the robot to have decreased torque detection accuracy, and
restrict the robot from moving when the robot is determined as being in the specific orientation.

15. The robot system according to claim 14, wherein, when the robot is determined as being in the specific orientation, the control device is further configured to reduce an operating speed of the robot.

16. The robot system according to claim 14, wherein, when the robot is determined as being in the specific orientation, the control device is further configured to restrict the robot from moving in a direction of the external force that causes the detection of the torques to have decrease torque detection accuracy.

* * * * *